United States Patent [19]
Smith

[11] 3,812,895
[45] May 28, 1974

[54] FASTENER AND RETAINER ASSEMBLY
[75] Inventor: Robert E. Smith, Kettering, Ohio
[73] Assignee: Dayton Progress Corporation, Dayton, Ohio
[22] Filed: Feb. 17, 1970
[21] Appl. No.: 12,040

[52] U.S. Cl.................. 151/41.74, 83/698, 151/69
[51] Int. Cl............................................. F16b 39/00
[58] Field of Search........ 151/41.74, 69, 70; 85/8.6, 85/8.9, 7, 62, 50; 83/698; 287/189.36 F

[56] References Cited
UNITED STATES PATENTS

| | | | |
|---|---|---|---|
| 2,314,121 | 3/1943 | Brennan | 85/8.6 UX |
| 2,364,401 | 12/1944 | Stellin | 83/698 X |
| 2,718,155 | 9/1955 | Firth | 151/69 UX |
| 2,832,390 | 4/1958 | Kustusch | 151/41.74 X |
| 2,860,540 | 11/1958 | Karlsson | 85/8.6 |
| 3,199,397 | 8/1965 | Borsody | 151/41.74 X |
| 3,263,549 | 8/1966 | Jordan et al. | 83/698 |
| 3,336,570 | 8/1967 | Tuchel | 85/8.6 X |

Primary Examiner—Ramon S. Britts
Attorney, Agent, or Firm—Jerome P. Bloom

[57] ABSTRACT

A washer-like safety device serving as a retainer for a headed fastener, such as a screw. The invention contemplates the screw or other fastener being applied in a counterbored passage having in the wall thereof an undercut forming a groove. The retainer is here disclosed as a plate having parallel sides, rounded ends, and a central aperture. The ends are flat and co-planar while the side portions bounding the aperture are offset in the form of an inverted "V." The retainer is dimensioned to easily set in the counterbore cavity to overlie the slotted or socketed head of the screw, whereupon its side portions are flattened to project its rounded ends to bridge the cavity and enter the groove. This retains the screw in the body to which it is applied while permitting its rotation for engaging to or disengaging from a related structure.

2 Claims, 7 Drawing Figures

PATENTED MAY 28 1974
3,812,895
SHEET 1 OF 2
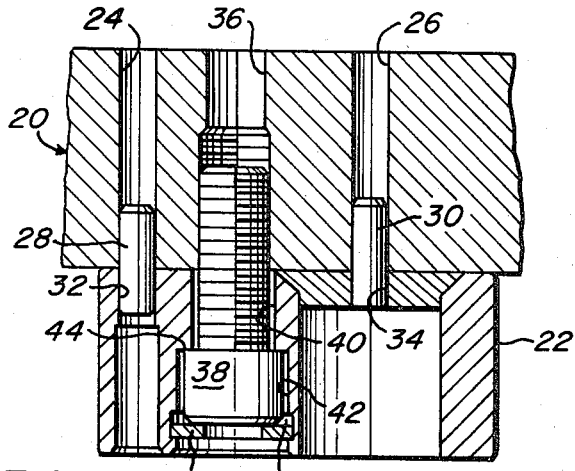
FIG-1
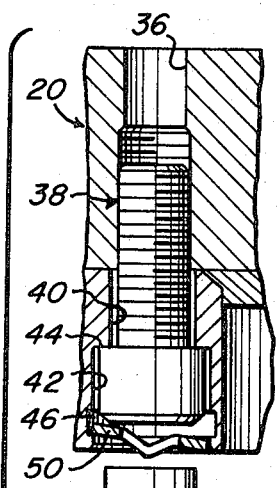
FIG-2
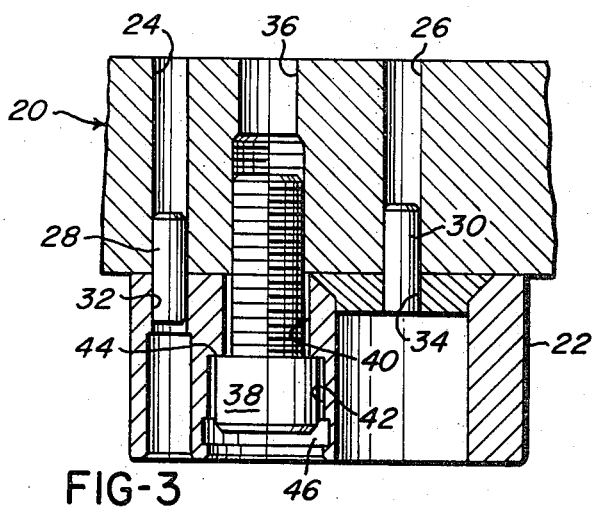
FIG-3
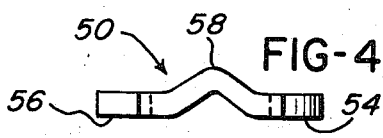
FIG-4
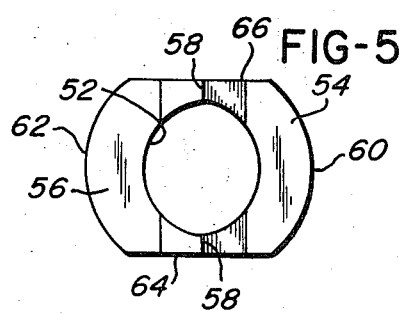
FIG-5
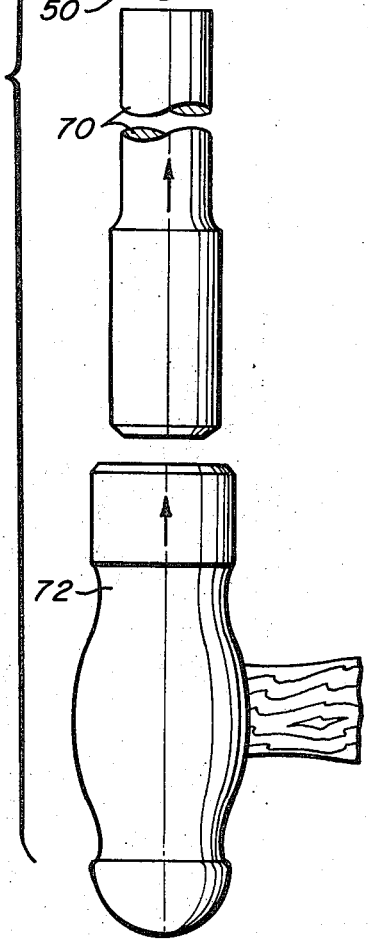
INVENTOR
ROBERT E. SMITH
BY Jerome P. Bloom
ATTORNEY

PATENTED MAY 28 1974 3,812,895

INVENTOR
ROBERT E. SMITH

BY Jerome P. Bloom

ATTORNEY

FASTENER AND RETAINER ASSEMBLY

THE INVENTION

This invention relates to a deformable, washer-like safety device which is particularly advantageous for use in releasably integrating a threaded or like fastener to a body. It enables the body to be fastened to or removed from a structural element without need for removal of the fastener device, if so desired. While lending itself to widespread industrial and commercial application, the invention device has great and particular utility for use in creating an improved punch retainer. For purposes of illustration it will be so described, though obviously not so limited as to its application.

BACKGROUND OF THE INVENTION

In a typical punch press, fixed to the shoe or ram of the press is a mounting plate or die shoe to which one or more punches must be attached. Typically, individual punches are mounted to depend from separate retainers which are individually attached to the mounting plate by threaded fasteners. By this expedient, a single punch can be applied or replaced by removing an individual retainer without disturbing the other punch components.

The application and replacement of punch retainers is a time consuming procedure. For example, in removal, a retainer must be held while its fastening screws are removed one by one and, on re-application, the fasteners must be individually manipulated and handled once more, separately from the retainer. Moreover, at times, in the course of and during press operation, a screw will fall from a punch retainer into or on the die half of a related die assembly and do serious damage. In some cases the screw may be lost. In any case, such problems do exist which are costly from the standpoint of time involvement as well as potential damage in the application and removal of a punch and punch retainer. The present invention is directed to the solution of these problems.

SUMMARY OF THE INVENTION

This invention contemplates a washer-like plate having a central aperture and, in a preferred embodiment, a generally oblong shape. As shown, it includes substantially flat, co-planar end portions bounding diametrically opposite portions of the aperture and interconnected by intermediate offset portions having in elevation a "V" shape. The offset portions are centered in the plate sides.

The invention further enables an improved punch retainer assembly accommodating fasteners in passages which are counterbored at one end, forming a shoulder against which the head of the related fastener, such as a screw, abuts. Of course, the threaded extremity of the fastener projects through the retainer passage for engagement to a related structure. As here contemplated, there is formed in the wall of the counterbored portion of each screw passage, spaced from the shoulder, a groove. The invention retainer is so dimensioned to be freely inserted in the cavity defined by the counterbore of the passage and in overlying relation to the head of the related screw. In its established position the retainer plate device is relatively free of the punch retainer body. However, when the offset portion of the plate is flattened against the head of the fastener, the end portions are projected into the adjacent groove and in underlying relation to the lip formed thereby. This serves to retain the fastener in an integrated relation to the body of the punch retainer while permitting the manipulation of the fastener for engaging and disengaging operations.

A primary object of the invention is to provide a retainer plate device of the class described which is economical to fabricate, more efficient and satisfactory in use, adaptable to a wide variety of applications and unlikely to malfunction.

Another object of the invention is to provide an improved retainer plate device facilitating assembly and disassembly of a unit the attachment of which is effected with threaded fasteners.

A further object of the invention is to provide an improved punch retainer embodying unique devices releasably integrating screw or like fasteners so as to prevent the separation of fasteners from the body yet provide for the ready removal of the body from a related structure or its reattachment thereto, even under difficult circumstances, without unnecessary handling of the fasteners or loss thereof in the process.

Another object of the invention is to provide a washer-like safety retainer device capable of serving as a retainer for a headed fastener while accommodating its manipulation as and when needs require for engaging and disengaging functions, and during use without individual separation from the body which it serves to attach to a related structure.

Another object of the invention is to provide a retainer for a fastener possessing the advantageous structural features, the inherent meritorious characteristics and the means and mode of use herein described.

Referring to the accompanying drawing wherein is shown one but obviously not necessarily the only form of embodiment of the invention, FIG. 1 is a cross sectional view showing two members secured together by a threaded fastener and utilizing a preferred embodiment of the invention;

FIG. 2 is an exploded view, partially in section, illustrating the application of the invention device;

FIG. 3 is a view of the structure of FIG. 1 with the invention device removed;

FIG. 4 is a side elevation view of the invention device;

FIG. 5 is a plan view of the invention device as shown in FIG. 4;

Like parts are indicated by similar characters of reference throughout the several views.

DESCRIPTION OF PREFERRED EMBODIMENT

Figure 6:
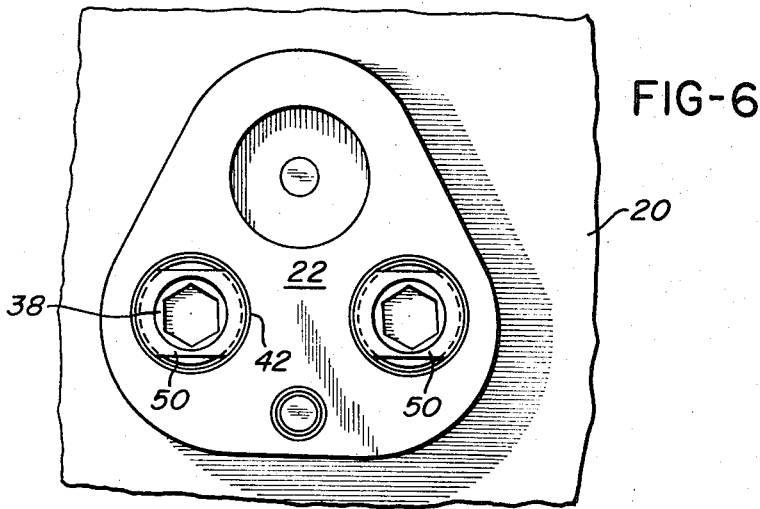
FIG. 6 is a plan view of a punch retainer utilizing the invention devices.

To illustrate the nature and character of the invention, reference is first had to FIG. 3 of the drawings. As there seen, a portion of a mounting plate 20 of a punch press die shoe has secured thereto the body of a punch retainer 22. The mounting plate is provided with apertures 24 and 26 in which are inserted dowel pins 28 and 30 respectively. It will be observed that the body of retainer 22 is provided with mating apertures 32 and 34 which respectively accommodate the projected ends of the dowel pins. In this manner the retainer 22 is precisely located with reference to the mounting plate 20.

The mounting plate 20 is also provided with an aperture 36, a wall portion of which is threaded and adapted thereby to be threadedly engaged by a fastener 38 which serves to securely mount the retainer 22 to the mounting plate. As shown, the punch retainer 22 is provided with a passage 40 which freely accommodates the projection therethrough of the threaded body of the fastener 38 while the head thereof seats to a shoulder 44 formed by a counterbore 42 in the face of the retainer body remote from the mounting plate 20.

It will be observed also that the wall of the cavity defined by the counterbore 42 is provided with an undercut forming an annular groove 46 the purpose of which will be further described. The latter is spaced from the shoulder 44 by substantially the thickness of the head of the fastener 38.

A washer-like retainer according to the invention is seen in FIGS. 4 and 5 of the drawings. As there shown, it comprises an oblong plate-like member 50 having a central aperture 52. To either end of its major axis the member 50 includes diametrically opposed, substantially flat, coplanar end portions 54 and 56 joined by an offset portion 58. This offset 58 causes the central portion of the plate member 50 to assume the configuration of an inverted "V." The apex of the offset is on a line normal not only to the major axis of the washer-like retainer but also its straight parallel side edges 64 and 66. Of course, the side edges define the limits of the minor axis of the member 50.

In the particular embodiment shown, it will be seen that the remote extremities 60 and 62 of the flat end portions 54 and 56 are arcuate in configuration. The edge portions 60 and 62 are each formed on a uniform radius and define the major dimension of the invention device which is less than that of the cavity provided in the counterbore 42 in which it is to be inserted.

At this point it is noted that while the side edges 64 and 66 are preferably straight, they may in certain instances take differing configurations as long as their relative dimensional limitations are observed.

FIGS. 1 and 2 illustrate the insertion and utilization of the fastener retaining device of this invention. As may be particularly seen in FIG. 2, the member 50 may be relatively freely and easily inserted in the counterbore 52 so as to overlie the head of the screw 38. In the position it assumes the device 50 will be in the general plane of the groove 46. Once the device 50 is applied to the head of the screw, one may then readily deform the offset 58 so as to cause an elongation of its major dimension. As will be obvious, this will cause the projection of the respective arcuate extremities 60 and 62 of the device within the groove 46. For purposes of a general illustration, FIG. 2 shows the pressure to deform the device being applied through the medium of a punch 70 with the impact force deriving in a conventional manner from a tool 72. Of course, the medium for applying the deforming force will depend on the particular application and the material of which the device 50 is formed in any one particular instance.

Thus, through the medium of the elongation of the device 50 along its major axis, using the head of the screw as an anvil, the respective rounded ends of the invention device are caused to underlie the lip formed by the undercut which defines the groove 46. The material of the member 50 is of such a nature that by the mere projection into the groove it will prevent a disengagement of the screw 38 from the body of the punch retainer. As will be obvious, depending on the slot or the configuration of the recess in the head of the screw 38, an appropriate tool may be inserted and the screw turned to disengage from the mounting plate 20 and conjointly therewith there will be a corresponding movement with the body 22. The rounded extremities 60 and 62 may reach and bear on the peripheral wall forming the base of the groove 46 and the form of the arcuate ends will enable its rotation without dislodgement from the punch retainer body.

Accordingly, the aperture in the plate-like safety device 50 serves dual purpose. It will be apparent that it permits the projection therethrough of an appropriate tool to engage and suitably apply to and manipulate the underlying fastener, irrespective of its nature and character. Secondly, by means of provision of this aperture and the fact that the nature and character of the device 50 is not one to firmly interlock in the retainer body 22 and against the head of the related screw, one may insert a suitable instrument to engage under the washer and pry it out of the groove 46 and the counterbore 42 in a manner reverse to its application.

It is noted that the proportions of the dimension, thickness and crown (offset) of the member 50 is preferably designed for application to a particularly grooved hole that it has sufficient surface engagement with the wall portions of the groove and sufficient strength to insure the device will not pop out during use. It may be in some instances that the configuration of the member 50 may be slightly greater in its dimension than the diameter of the passage in which it is applied. However, due to the foreshortening of the device along its minor dimension, the device may be freely and readily inserted in a counterbore as illustrated, for example, by introducing, on insertion, first one end portion 60 or 62 in the undercut provided by the related groove such as 46. Of course, in any case, the minor axis of the invention device will have a dimension so as to clear the wall of the passage or cavity in which it is inserted.

Figure 7:
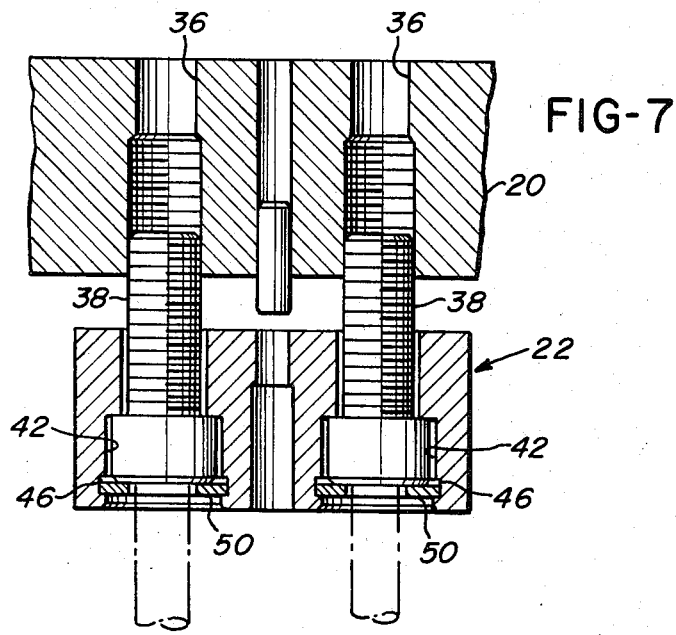
FIG. 7 is a sectional view taken on line 7—7 of FIG. 6, illustrating an added benefit of the invention as embodied in a punch retainer.

As noted heretofore, with reference to FIGS. 6 and 7 of the drawings, it may be seen that the invention device not only has the benefit of avoiding the necessity of applying screws separate from the punch retainer body or removing them separate from the punch retainer body but they are capable of assisting and serving an even more desirable function in relation to the punch retainer.

In the example illustrated in FIG. 6, it will be seen that the punch retainer is held to the mounting plate 20 by means of two screws 38 which are laterally spaced and each has in overlying relation to the head thereof and engaged in the adjacent groove 46 one of the members 50 which has been applied as previously described. Referring to FIG. 7, which is a cross section through the fastening area, it may be there seen that the screws 38 may be simultaneously manipulated for withdrawal from the mounting plate 20, whereupon the backing of the members 50 insure a complete withdrawal in a simple and easy fashion of the retainer body per se with the screws integrated therein. This can overcome any problem of inadvertent jamming in fastening the retainer body to the mounting plate or as a result of damage during the function of the related punch.

Only so much of the retainer structure is here described to enable an understanding of the invention, particularly since the invention may be applied to retainers of various size, shape and application. In the instance of the illustration in FIGS. 6 and 7, there is shown only one dowel pin and a passage in the retainer body to receive a punch to be held thereby. It is repeated, this is not essential to an understanding of the invention and the same is not described in any detail in order that the issues not be clouded in reference to the matter forming the subject of the present invention.

Attention is directed to the fact that under normal circumstances the width of the groove 46 formed by the undercut in the wall of the counterbore as here illustrated will be somewhat greater than the thickness of the device 50 constituting the present invention. This is not only to facilitate the application of the device but to provide a better frame of reference to the related fastener to which it pertains as well as to facilitate its removal, if and when desired. The device is a releasable device, the release being effected, as previously described, in a simple fashion and without the need for any special tool.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described my invention I claim:

1. In combination, a body having a cavity with a fastener therein for releasably attaching said body to a mounting surface and a device for retaining said fastener in said cavity in said body, said fastener having a head with a tool receiving recess therein, said cavity having a circumferential groove disposed above the head of said fastener, said device comprising an essentially planar member with a continuous periphery, said member being elongated in one direction defining the length thereof and having a deformable offset extending the width thereof which offset is designed to be flattened against the head of said fastener to a plane substantially perpendicular to the longitudinal axis of said cavity to thereby increase the length of said member in a direction generally at right angles to said offset and to cause end portions of said member to project in said groove, the width of said member having a dimension less than the diameter of said cavity to define a space to either side thereof, said member having an aperture within said offset of less diameter than that of the fastener head to accommodate projection therethrough of a tool to manipulate said fastener or to facilitate the removal of said member, and said member when flattened having a length which is less than the maximum diameter of said groove to permit a rotative move thereof when flattened within said cavity.

2. Apparatus as in claim 1 characterized by the sides of said member being generally parallel and the ends of said member having a rounded configuration.

* * * * *